Oct. 20, 1931.  W. R. TURNBULL  1,828,348
VARIABLE PITCH PROPELLER
Filed Oct. 4, 1929  3 Sheets-Sheet 2
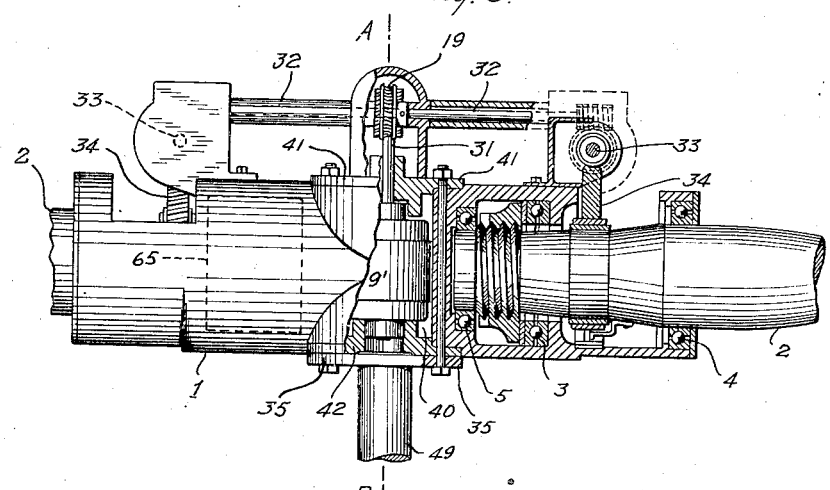
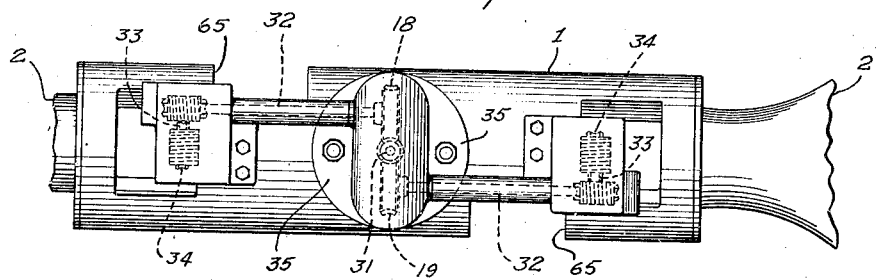
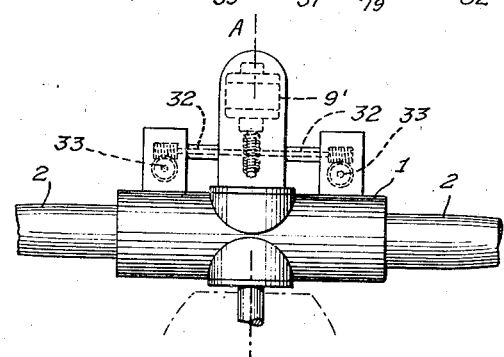
INVENTOR
WALLACE R. TURNBULL
BY
ATTORNEYS

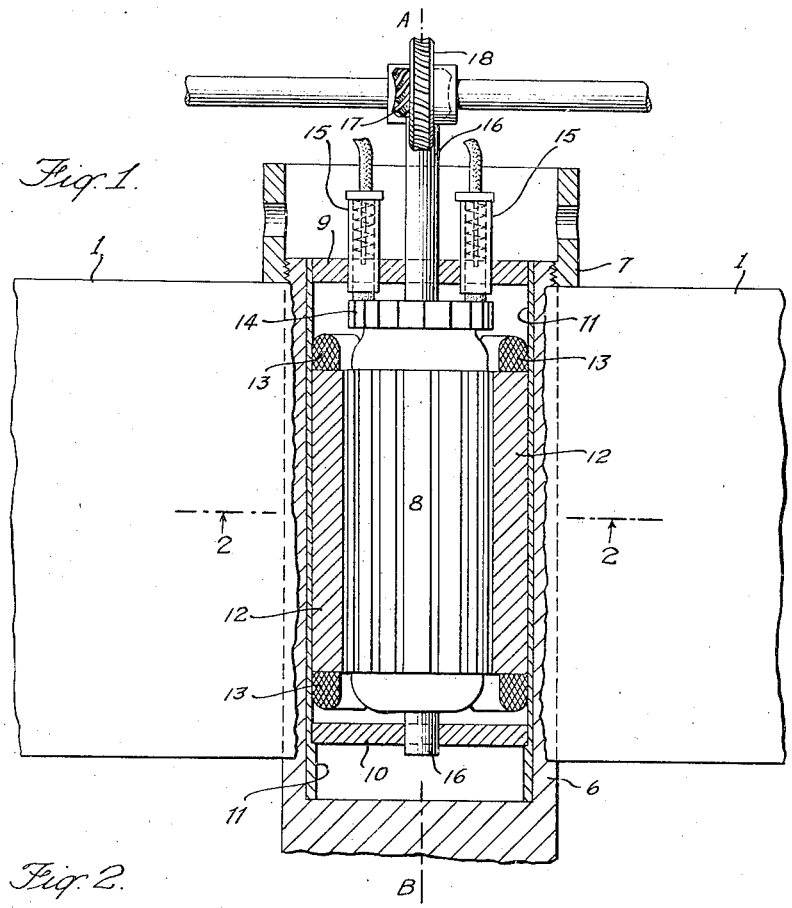
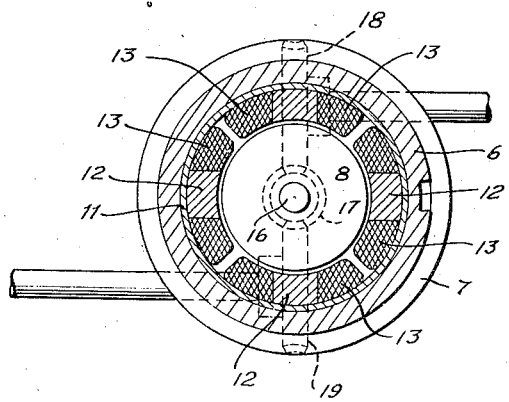

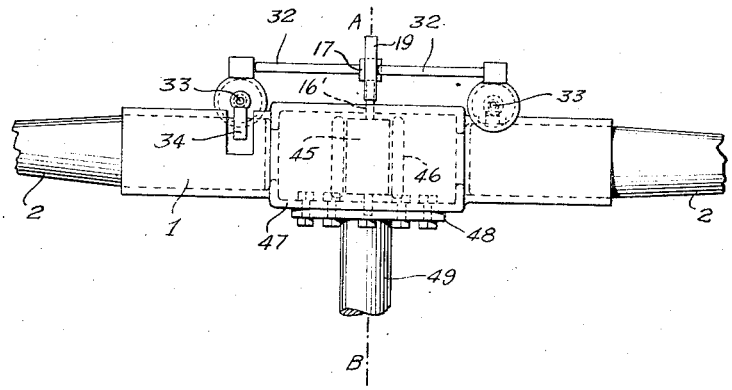
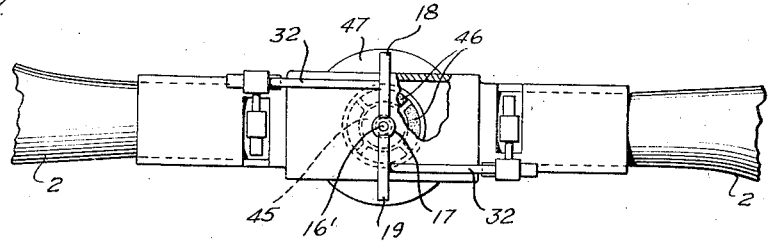
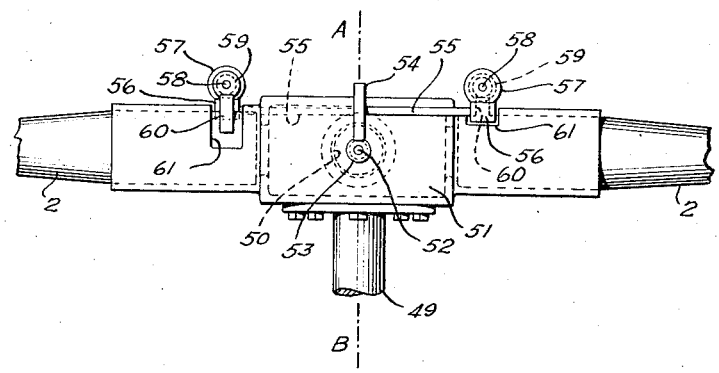
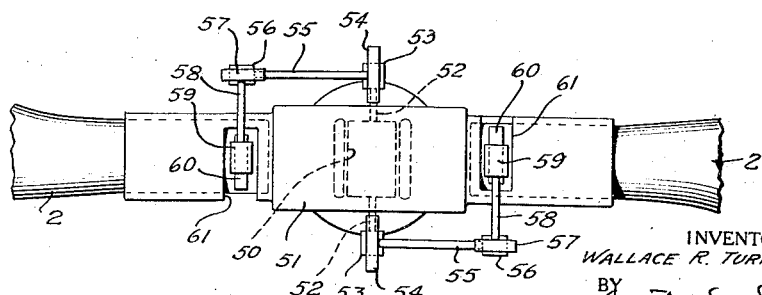

Patented Oct. 20, 1931

1,828,348

UNITED STATES PATENT OFFICE

WALLACE R. TURNBULL, OF ROTHESAY, NEW BRUNSWICK, CANADA

VARIABLE PITCH PROPELLER

Application filed October 4, 1929. Serial No. 397,182.

This invention relates to variable pitch propellers and particularly to propellers of this character embodying an electric motor driven mechanism for adjusting the blade pitch and this application is a division in part of my application Serial No. 385,784 filed August 14, 1929.

One object of the invention is a novel construction and arrangement of an electric motor and propeller hub structure as a unit which is characterized by its compactness, its lightness in weight, its durability and reliability, and the certainty, celerity and accuracy with which the pitch adjustment of the blades may be made. A further object is a propeller unit of this character characterized by its simplicity in construction and arrangement and the economy with which it may be manufactured and assembled.

For a better understanding of the invention reference may be had to the accompanying drawings forming a part of this application wherein:

Fig. 1 is a part sectional and side view of the central part of the hub structure of a variable pitch propeller according to one embodiment of the invention, Fig. 2 is a view at right angles to Fig. 1 along the line 2—2 with a part of the structure removed, Fig. 3 is a side view partly in section of another embodiment of the invention, Fig. 4 is a view taken at right angles to Fig. 3, Fig. 5 is a view of a combined variable pitch propeller and motor pitch adjusting mechanism embodying certain features of the invention, Fig. 6 is a side view showing another embodiment of the invention, Fig. 7 is a view taken at right angles to Fig. 6, Fig. 8 is a view of another embodiment of the invention, and Fig. 9 is a view taken at right angles to Fig. 8.

Referring to the drawings there is illustrated a variable pitch propeller including a central hub structure 1 and variable pitch blades 2 which are journalled within bearing sockets formed radially within the hub structure. The axis of revolution of the propeller is indicated by the dot and dash line A—B. The blades 2 may be journalled in the hub structure 1 in any suitable manner adapting them to take up the high centrifugal forces encountered in aircraft operation, as, for example, as illustrated in Fig. 3 where each blade comprises a thrust bearing 3 to take up the centrifugal forces disposed intermediate a pair of other bearings 4 and 5.

Referring to Fig. 1 the blades have been omitted for convenience in illustration and only the central part of the hub construction 1 is illustrated. The electric motor for varying the pitch of the blades is disposed centrally of the hub structure 1 and in the particular embodiment shown is contained within the hollow end 6 of the drive shaft, the propeller hub being inserted over this hollow end 6 of the shaft and splined thereto and anchored by means of the nut 7 which is screw-threadedly attached to the end of the hollow shaft 6 and engages the hub structure. The motor armature 8 may be rotatably mounted within the shaft 6 in any suitable manner as, for example, in the bearing members 9 and 10 which are inserted in and rigidly secured to the shaft in any suitable manner, or the electric motor may be formed as a unit and inserted within the hollow shaft 6 all ready for fastening thereto. In the particular embodiment shown the bearing members 9 and 10 are mounted within a shell-like frame 11 which is adapted to fit snugly and tightly within the hollow shaft 6 the shell 11 carrying the field poles 12 around which are wound the field coils 13. The shell or frame 11 is illustrated as being very thin with a view to utilizing the hollow shaft 6 and the central hub structure 1 as a part of the magnetic circuit thereby enabling the use of a motor of larger overall dimensions within the hollow shaft 6 and minimizing the weight by utilizing the hollow shaft and central hub structure as a part of the motor frame. The shell frame 11 may, of course, be made thick enough within itself to take care of the magnetic flux. In some cases it might be desirable to mount the field coils 12 directly upon the inner sides of the hollow shaft 6 without the intermediary member 11. The motor commutator diagrammatically indicated at 14 is of the disc type and the brushes are mounted within casings 15 carried by the bearing member 9 the brushes engaging the commutator 14 as indicated and being automatically adjustable in a direction parallel to the axis of revolution A—B against the springs indicated in the casings 15. The motor must be, of course, of the reversible type and any arrangement for this purpose may be used. The collector rings and brushes for leading the current to the motor as well as the connections from the collector rings to the commutator brushes and the field coils are omitted for convenience in illustration. The motor shaft 16, which is in line with the axis of revolution A—B, overhangs the propeller hub structure and is provided with a worm 17 meshing with the worm wheels 18 and 19 for transmitting motion to the variable pitch blades. The reduction gearing between the blades and the motor shaft 16 may be of any suitable and desired character as, for example, of the character shown in Figs. 3 and 4 described below. With the propeller construction shown the motor may be either permanently or detachably mounted within the hollow shaft 6 while the worm wheels 18 and 19 and gearing therefrom can be assembled into their places after the propeller is mounted on the shaft 6 and the tightening nut screwed home.

In Fig. 3 I have illustrated a combined variable pitch propeller and electric motor drive mechanism wherein the electric motor is not only symmetrically arranged about the propeller drive shaft axis A—B, but is embodied in the propeller hub. In the particular embodiment shown the electric motor shaft is in line with the propeller drive shaft axis, though the invention is not limited to this relative disposition. The motor may be built as a unit and inserted in a recess 40 in the propeller hub with one end 31 of the motor shaft geared to the blades by the gearing system including the counter shafts 32 which are geared at one end to a worm on the motor shaft and at the other end respectively to the two blades of the propeller through counter shafts 33 and segments 34, a two bladed propeller being shown for convenience in illustration. The motor may be supported by plates or brackets 41 and 42 fastened on the sides of the hub, or the hub may be formed with an axial recess just fitting the motor and permitting the insertion of the same from one side of the hub 1, with a retaining plate such as 41 or 42 for retaining the same in position. Instead of having the motor built as a unit and inserted in a recess in the propeller hub it may be desirable to design the motor frame as a part of the propeller hub with the provision of means for supporting the field poles and bearings of the armature of the motor in the propeller hub. This construction results in a structure which is marked by its lightness in weight and by its compactness and also by the facility with which the motor may be geared to the variable pitch blades with the high reduction ratios, as for example more than 40,000 to 1, which are desirable in mechanisms of this kind.

In the construction shown in Figs. 3 and 4 the propeller unit may be secured to the propeller drive shaft in any suitable manner, as for example by means of a flange 35 disposed on the propeller shaft with bolts passing through this flange and through the propeller hub.

In Fig. 5 I have shown a variable pitch propeller with an electric motor drive mechanism wherein the reduction gearing is wholly disposed forward of the plane of rotation of the blades as shown, for example, in Figs. 1 to 5, but in this case the motor is also disposed forward of the plane of rotation of the propeller with its motor shaft in line with the propeller drive shaft axis.

In the modification according to Figs. 6 and 7 the propeller hub and the electric motor are designed as a unit the metal of the hub structure being utilized wholly as a frame for the motor and the motor shaft 16' is in line with the axis of revolution A—B of the propeller with the motor itself being disposed in the plane of rotation of the propeller blades. The motor armature is indicated at 45 and the field coils at 46, the coils 46 being wound around pole pieces which form a part of the hub structure or are separate parts which are attached to the propeller hub structure about the recess provided for the motor armature. The motor armature itself is journalled in any suitable manner as, for instance, in a bearing formed integrally with the hub structure on one side and a separate bearing member on the other side, the latter, for example, being similar to the members illustrated in Fig. 3 for the same purpose. The shaft 16' may be provided with a worm 17 and a reduction gearing similar to that described in connection with Figs. 1, 2 and 3. In the particular embodiment illustrated in Figs. 6 and 7 the propeller hub is formed with integral lugs or flanges 47 for bolting the propeller to the flange 48 of the drive shaft 49.

In the embodiment of Figs. 8 and 9 the electric motor 50 is also mounted in the plane of rotation of the propeller blades 2 but in this instance the motor shaft 52 is at right angles to the axis of revolution A—B of the propeller. The motor 50 may be formed as a separate unit and inserted and anchored in a recess formed in the hub 51 or it may be, as described in connection with Figs. 6 and 7, designed as a unit with the propeller hub 51, the latter forming the motor frame and motor bearings and also forming or carrying the motor pole pieces. The motor shaft 52 overhangs both sides of the propeller hub structure and is provided with worm wheels 53 thereon, the latter meshing with worm wheels 54 carried by counter shafts 55. The latter in turn are provided on the opposite ends with worms 56 which mesh with worm wheels 57 carried by shafts 58, the latter in turn being geared by means of the worms 59 to the gear segments 60 carried by the blade shanks, the hub structure 51 being provided with openings 61 for the accommodation of the gearing and for lightening the weight of the propeller hub. The propeller unit may be mounted on the drive shaft 49 in any convenient manner as, for example, in the manner described in connection with Figs. 6 and 7.

When the motors are built as units and inserted in recesses in the hub structures, as described in Figs. 6, 7, 8 and 9, it is preferable that the recesses shall be formed of dimensions just sufficient to accommodate the electric motor units, as for example, with the motor units fitting tightly therewithin and being insertable in on one side only. The illustrations omit certain conventional parts of the propeller units of this character and in some respects are purposely diagrammatic with a view to convenience and brevity. I have for convenience illustrated propellers with only two blades but certain of the embodiments are particularly adapted to three and four blade constructions.

I have found also that a reduction gearing of the character above set forth may be obtained in practice with practically no appreciable backlash even with reduction ratios of from 1 to 40,000 to 1 to 60,000 which I have found desirable for practical variable pitch aeronautical propellers. Moreover the propeller units set forth embody the combined and desirable features of compactness, light weight, reliability, and certainty and accuracy of pitch adjustment at all times and moreover adjustments with the desired celerity to the exact degree desired.

I claim:

1. A variable pitch aeronautical propeller including an electric motor pitch adjusting drive mechanism wherein the motor is contained within a recess symmetrically disposed at the plane of rotation of the blades and upon the axis of rotation of the propeller, with the motor shaft projecting outside the propeller hub and reduction gearing between the projecting shaft and the variable pitch blades.

2. In a variable pitch aeronautical propeller a hollow drive shaft, a propeller hub secured to the said hollow shaft, an electric motor disposed within the hollow shaft, and reduction gearing between the electric motor and the adjustable pitch blades.

3. In a variable pitch aeronautical propeller of the character set forth in claim 2 wherein the hollow shaft forms a part of the magnetic circuit of the motor.

4. In an aeronautical propeller of the character set forth in claim 2 wherein the hollow shaft and the propeller hub form a part of the magnetic circuit of the motor.

5. In a variable pitch aeronautical propeller of the character set forth in claim 2 wherein the motor field coils and pole pieces are carried by a metallic shell fitting tightly into the hollow shaft.

6. In a variable pitch aeronautical propeller of the character set forth in claim 2 wherein the motor field coils and pole pieces are carried by a metallic shell fitting tightly into the hollow shaft and the motor armature is journalled in bearing members carried by the shell.

7. In a variable pitch aeronautical propeller of the character set forth in claim 2 wherein the motor field coils and pole pieces are carried by a metallic shell fitting tightly into the hollow shaft and the armature is provided with a disc commutator with brush frames carried by a member which is supported by the shell.

8. A variable pitch propeller including an electric motor pitch adjusting drive mechanism wherein the electric motor is symmetrically arranged about the drive shaft axis and is disposed in the plane of rotation of the propeller.

9. A propeller of the character set forth in claim 8 wherein the electric motor is disposed within the propeller hub.

10. A variable pitch propeller of the character set forth in claim 8 wherein the electric motor shaft projects beyond the propeller hub and is geared to the variable pitch blades by a gearing disposed forward of the plane of rotation.

11. A variable pitch aeronautical propeller including an electric motor pitch adjusting drive mechanism wherein the motor is contained within a recess formed in the propeller hub with a clamping plate disposed across the recess on one side for retaining the motor within the recess.

12. A propeller of the character set forth in claim 11 including a second plate on the other side of the propeller hub for assisting in holding the motor in position.

13. A propeller of the character set forth in claim 11 wherein the recess in the propeller hub is of such form and character as to support the motor as a unit therein.

14. A variable pitch aeronautical propeller including an electric motor pitch adjusting drive mechanism with the motor frame formed as a propeller hub with sockets for the reception of variable pitch blades.

15. A variable pitch aeronautical propeller with blades journalled in bearing sockets formed in the propeller hub, an electric motor rigidly carried by and rotating with the propeller, with the motor shaft in line with the axis of rotation of the propeller and projecting to one side of the propeller and a reduction gearing between the motor and the blades including a worm gear on the shaft and a separate worm gear meshing therewith for each of the propeller blades.

16. In a variable pitch aeronautical propeller, a propeller hub having blades journalled therein for adjustments in pitch and including an electric motor for adjusting the blades, a part of the propeller hub being included in the magnetic circuit of the motor.

In testimony whereof, I have signed my name to this specification.

WALLACE R. TURNBULL.